July 3, 1951  R. M. POTTER  2,559,090
ELECTROCHEMICAL PROPORTIONING APPARATUS
Filed Sept. 21, 1945  2 Sheets-Sheet 1

Inventor:
Ray M. Potter
By Paul, Paul & Moore
Attorneys.

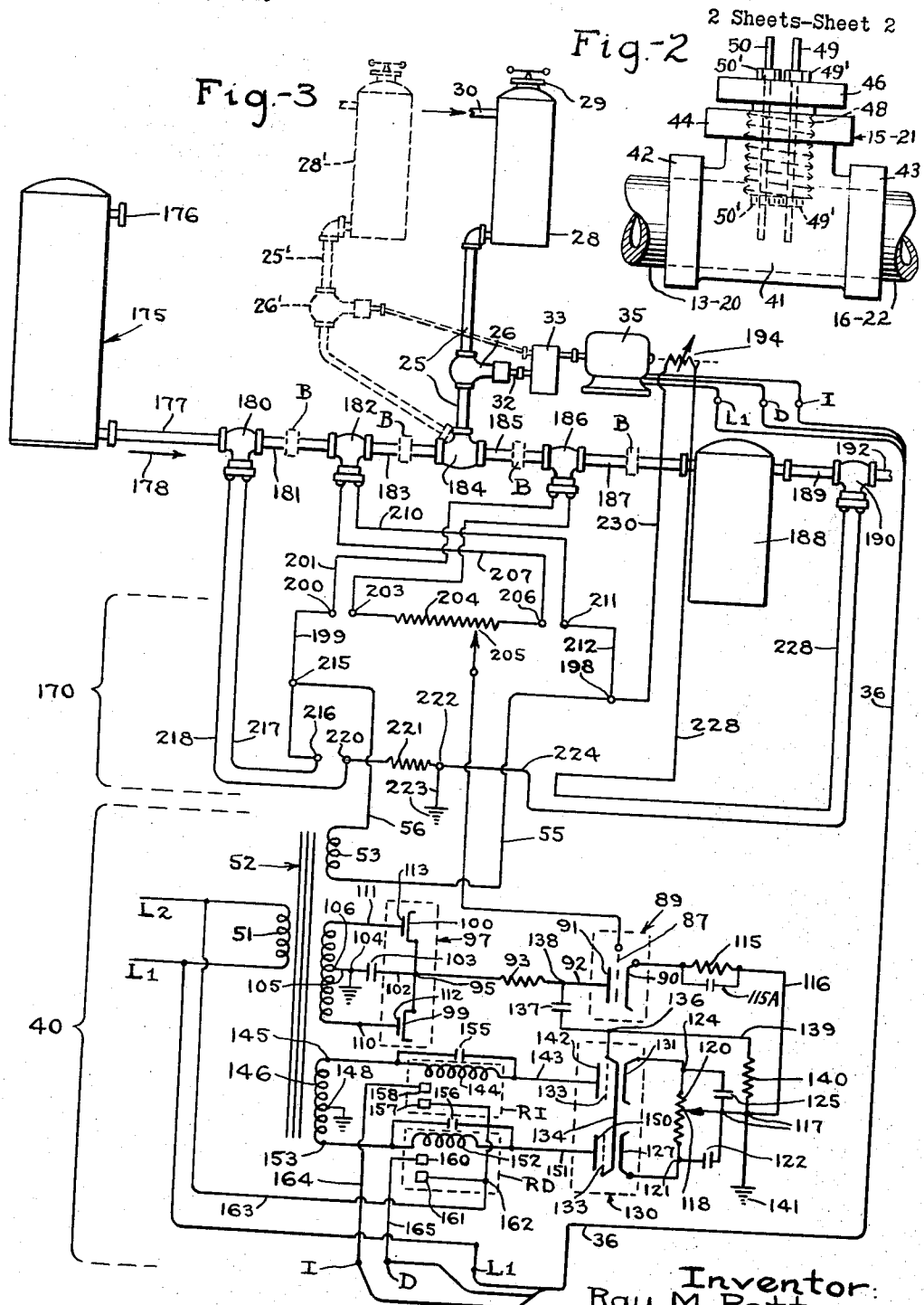

Patented July 3, 1951

2,559,090

UNITED STATES PATENT OFFICE 2,559,090

ELECTROCHEMICAL PROPORTIONING APPARATUS

Ray M. Potter, Minneapolis, Minn.

Application September 21, 1945, Serial No. 617,736

7 Claims. (Cl. 210—28)

This invention relates to method and apparatus for controlling the mixture of fluids and more particularly to methods and systems wherein fluids are mixed automatically and continuously and a predetermined mixture ratio maintained indefinitely. More particularly the invention relates to methods and apparatus wherein two or more electrically conductive fluids may be maintained in predetermined mixture ratio regardless of change in chemical character of either one or both of the fluids being mixed to the end that the resultant mixture has prescribed chemical and/or physical characteristics.

It is an object of the present invention to provide the foregoing methods and systems. It is a specific object of the invention to provide methods and apparatus for controlling the admixture of purifying agents such as chlorine to water as in the treatment of water containing organic matters, such as algae, pathogenic bacteria, etc., and to provide in such systems for the automatic maintenance of a predetermined mixture ratio to compensate for varying conditions of the water being treated and to maintain a predetermined excess of treating reagent such as chlorine in the treated water. The invention is applicable not only to the treatment of water but in general to the mixing and proportioning of electrically conductive fluids.

Other and further objects of the invention are those inherent in the apparatus herein illustrated, described and claimed.

The invention is illustrated with reference to the drawings in which

Figure 2 is a fragmentary side elevational view of one of the elements of the invention; and Figure 3 is a diagrammatic view of a modified form of the invention used in an illustrative application of the invention, that is to say, in the chlorine treatment of water.

Throughout the drawings corresponding numerals refer to corresponding parts.

Figure 1:
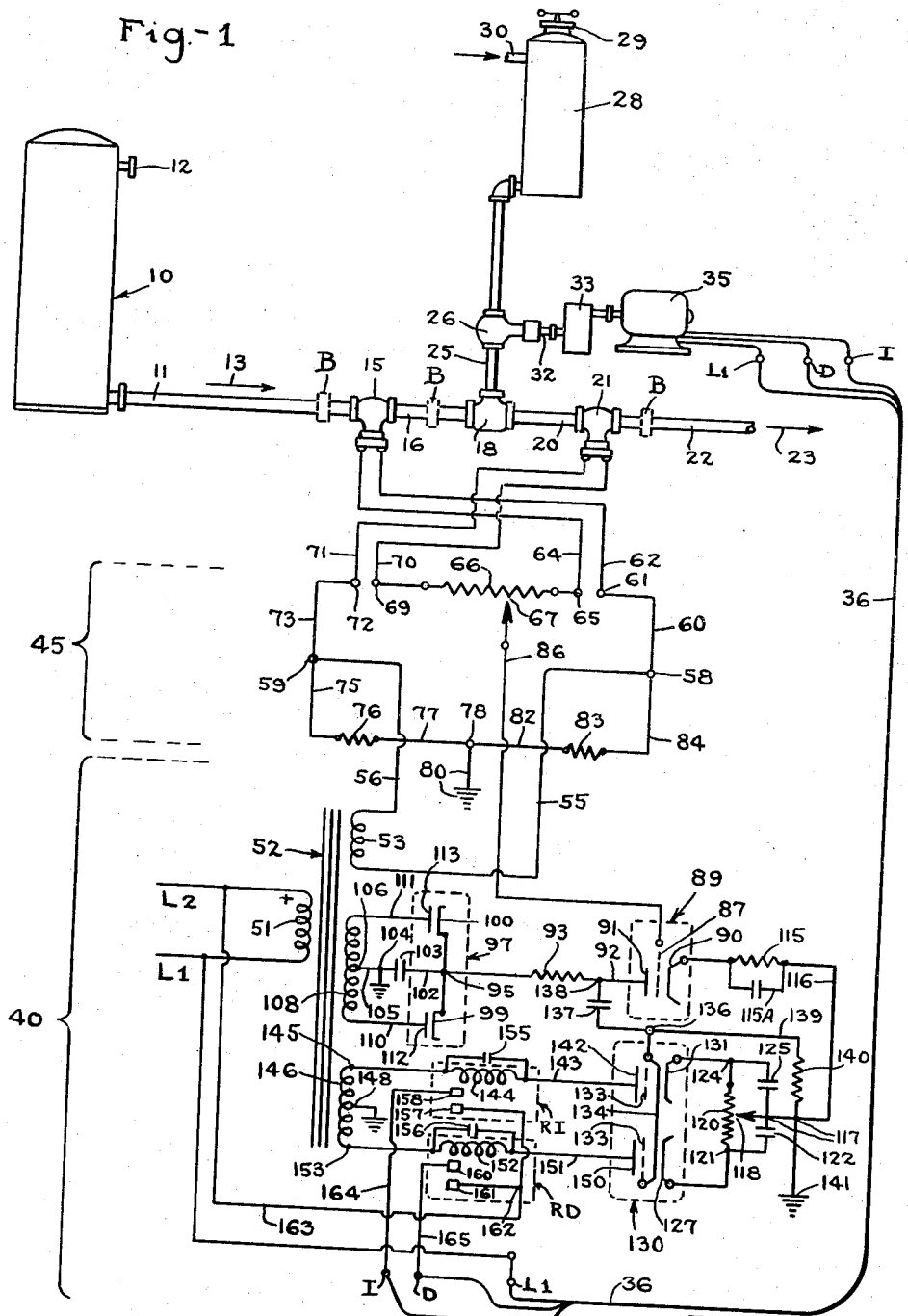
Figure 1 is a schematic view illustrating the method of the invention and the apparatus used in carrying out such method.

Referring to the drawings, Figure 1, at 10 there is illustrated a reservoir containing an electrically conductive fluid which is delivered from the reservoir by way of line 11. The reservoir 10 may be of any size or may simply be a holding tank in an incoming supply line 12 for the fluid undergoing treatment. The flow in line 11 is in the direction of arrow 13. The line passes through a first conductivity unit 15, illustrated in detail in Figure 2 and hereinafter more completely described, thence through line 16, a mixing union 18, line 20, a second conductivity unit 21 of the same type as shown in Figure 2, and thence to the delivery line 22 from which the fluid travels in the direction of arrow 23 to the load. It is assumed that the fluid may be drawn from line 22 at a variable rate or the withdrawal stopped completely in accordance with the load demand.

To mixing union 18 there is connected a supply line 25 carrying liquid or gaseous fluids, line 25 being controlled by a valve 26. Line 25 is connected to a supply tank 28. Tank 28 may contain liquid or gas, depending upon whether a liquid or gas is added to the main (liquid or gaseous) fluid flowing in line 11. Thus, tank 28 may contain chlorine, where chlorine is being added to water flowing in line 11. The supply tank 28 is shown as having a removable sealing cover 29 and where tank 28 contains a liquid, a pressure supply line 30 may be included by which a static pressure of air or inert gas may be supplied to the tank 28 for maintaining a constant head therein. If desired, the tank 28 may simply be an open elevated tank where the fluid contained therein is liquid, and the hydrostatic head may thus be relied upon to provide the necessary pressure to force the fluid in the tank 28 through the line 25 to the mixing union 18.

The valve 26 is operated through stem 32 which communicates through a reduction gear 33 to the reversible motor 35. The motor is energized through three electrical conductors $L_1$, I and D which are connected through cable 36 to a control mechanism shown opposite the bracket 40.

In some instances it is desired to add two or more fluids in controlled amounts to the fluid flowing in line 177. When this is desired there is provided a second or multiple tank, as illustrated at 28', which leads through pipe 25' and valve 26' to the mixing union 184. Valve 26' is, under such circumstances, connected so as to be motor operated from gearbox 33. Thus, as motor 35 operates to move valve 26 from the open to the closed position, valve 26' may likewise be operated in accordance with any control function so as to move valve 26' from the open to the closed position, or by a negative function to move valve 26' from the closed to the open position, where a variation in ratio of material from tanks 28 and 28' is desired.

The provision of two tanks 28 and 28' is especially desirable in water treatment systems in which chlorine and ammonia gases are added in controlled ratio to water as is now done manually in the chloramine process for disinfecting water. Thus, in accordance with my invention, chlorine from a tank 28 and ammonia from a tank 28' may be added in controlled proportions and in varying combined amounts to a variable water flow in line 177, so as to maintain the percentage of chlorine and ammonia at a prescribed level in the water regardless of variations in flow in line 177.

The conductivity units 15 and 21 are illustrated in Figure 2. The units consist of an ordinary pipe T generally designated 41 having the coupling ends or flanges 42, 43 and 44. The coupling 42 is connected to either line 13 or 20, as the case may be; the coupling 43 is connected to line 16 or 22, as the case may be; and the coupling 44 serves as a mounting for the conductivity unit. The conductivity unit consists of a plug 46 made of insulating material which is threaded to fit into the internal threads 48 of the connector 41. The insulating block 46 is drilled to receive a pair of electrodes 49 and 50 which are sealed to the plug as for example by means of the nuts 49' and 50', respectively. The electrodes 49 and 50 are preferably made of a non-corrosive material such as stainless steel, carbon, platinum or the like, or they may be the customary mercury electrode used in ion determination. The electrodes serve, with the electrically conductive fluid flowing through the T 41, to form a conductive path which is utilized as hereinafter described for the controlling functions.

The control circuits in Figure 1 include a resistance bridge shown generally opposite bracket 45 and transformer, amplifier, rectifier and discriminator tube circuits shown opposite bracket 40. Alternating current supply lines L1 and L2 which are connected to the primary winding 51 of the transformer generally designated 52 energize the system.

The transformer has a secondary winding 53 which is connected through lines 55 and 56 to terminals 58 and 59, respectively, of the resistance bridge. The resistance bridge circuit is as follows: From alternating current terminal 58, line 60 extends to terminal 61 and thence through line 62 to one terminal of the conductivity unit 15, the circuit being continued from the other terminal of said conductivity unit through line 64 to terminal 65 and thence through a resistance 66 to terminal 69 which is connected through line 70 to one terminal of the conductivity unit 21. The circuit continues from the other terminal of the conductivity unit 21, through line 71 to terminal 72 and thence over line 73 to alternating current input terminal 59. The bridge circuit continues from terminal 59 through line 75 and resistance 76, through line 77 to ground terminal 78, the ground line and ground being illustrated at 80. From the ground terminal 78 the circuit continues through line 82, resistance 83 and line 84 to alternating current input terminal 58. The output, or signal voltage of the bridge is taken from adjustable tap 67 and thence through line 86 to the grid 87 of an amplifier tube generally designated 89.

The amplifier 89 has a cathode 90 which is indirectly heated by a filament not illustrated and a plate 91 which is connected through line 92 and resistor 93 to the cathode terminal 95 of a full wave rectifier tube generally designated 97. The cathodes 99 and 100 of the rectifier are indirectly heated by filaments not illustrated and are connected to the cathode terminal 95. Terminal 95 is also connected through line 102 and condenser 103 to the ground terminal 104, the ground terminal being connected through line 105 to the midpoint 106 of a transformer secondary winding 108. The terminals of the transformer winding 108 are connected through lines 110 and 111 to plates 112 and 113, respectively, of the full wave rectifier tube 97.

The cathode 90 of amplifier tubes 89, which is indirectly heated by a filament not shown, is connected through resistance 115 and shunting capacitor 115A and thence through line 116 to junction 117 which is in turn connected through an adjustable tap 118 to an intermediate point of resistor 120. Terminal 121 of the resistor is connected through condenser 122 to terminal 117. Terminal 124 is likewise connected through condenser 125 to junction 117. Terminal 121 is likewise connected to a first cathode 127 of a discriminator tube 130, the second cathode 131 of said tube being connected to junction 124. The cathodes of tube 130 are indirectly heated by filaments not illustrated. The grids 133, adjacent cathodes 127 and 131, are connected together by line 134 and are thence connected to junction 136. Junction 136 is connected through a condenser 137 to junction 138 in the plate circuit of the amplifier tube 89. Junction 136 is likewise connected through line 139 and resistor 140 to junction 117. Junction 117 is grounded at 141. Plate 142 of the discriminator tube is connected through line 143 to the coil 144 of relay generally designated RI, the opposite terminal of the coil 144 being connected directly to terminal 145 of a third transformer winding 146. The mid-terminal of the transformer winding is grounded as indicated at 148. Plate 150 of the discriminator tube 130 is connected through line 151 to one terminal of the coil 152 of the relay generally designated RD, the opposite terminal of said coil being connected to terminal 153 of the transformer winding 146. The coil 144 is shunted by condenser 155 and coil 152 is shunted by condenser 156. Each relay has a pair of contacts which are closed and opened by the energization or deenergization, respectively, of the associated relay coil. Thus, coil 144 serves to open and close contacts 157 and 158, whereas coil 152 serves to open and close contacts 160 and 161. Contacts 157 and 161 are connected together at junction 162 and are thence connected through line 163 to line L2. Contact 158 of relay RI is connected through line 164 to terminal and line I and thence through cable 36 to the correspondingly designated terminal of motor 35. Contact 160 of relay RD is similarly connected through line 165 to terminal and line D, and thence through the cable 36 of the correspondingly designated terminal of motor 35.

Operation of the system shown in Figure 1 is as follows: The fluid flowing in line 11 establishes the resistance across conductivity unit 15 and the fluid flowing through line 20, which contains a certain proportion of the second fluid fed from tank 28, establishes the conductivity of unit 21. Where it is desired to maintain a definite concentration of the fluid from tank 28 in the flow of fluid from reservoir 10, the variable adjustment at 67 is positioned until a prescribed potential difference exists between the ground terminal 78 and the terminal 67 in relation to the potential applied through transformer winding 146 and relay coils 144 and 152 to the plates 142 and 150, respectively, of the discriminator tube 130. Since the bridge circuit consisting of resistors 66, 76, 83 and the conductivity units 15 and 21 is energized from an alternating current source, viz. transformer winding 53, the potential from ground terminal 78 to terminal 67 of the bridge is an alternating current potential. The value of this potential may vary and its phase relation in respect to the potential across 58 to 59 may likewise change so as to be in phase or 180° out of phase, all depending upon the variation in conductivity of the units 15 and 21. The value of the potential at 67 may be zero or a value above or below that at ground terminal 78 at any given instant, depending upon the resistance values of resistors 67, 76, 83 and the resistance of units 15 and 21, and hence may be in phase or 180° out of phase with the alternating current supply to the bridge at terminals 58 and 59. Hence, the potential applied through line 86 to the grid 87 of the amplifier tube 89 may be either in phase or 180° out of phase with the potential applied simultaneously to the two plates of the discriminator tube 130. The amplified output of the tube 89 is transmitted through condenser 137 and hence the grids 133 of the discriminator tube 130 may be either in phase or 180° out of phase with the plate potential, and since the grid potential may also vary, there is provided a discriminatory control wherein neither relay coil 144 nor 152 is energized or one or the other of them is energized.

It may be assumed for purposes of discussion that the addition of fluid from tank 28 increases the electrical conductivity of the fluid from reservoir 10, that the system is in equilibrium, that the potential at 67 is the same or nearly the same as ground potential, and that neither relay RI nor RD is operated. Hence, motor 35 is not energized and valve 26 admits a constant flow into mixing union 18, which is satisfactory for the constant flow that has been taking place in line 11—22. If it is assumed that the fluid flow through line 11—22 decreases or increases after the system has thus reached equilibrium, there will accordingly be a greater or lesser concentration of the incoming fluid from line 25 in the mixture flowing in lines 20—22, hence a greater or lesser electrical conductivity through unit 21. This in effect decreases or increases the amount of resistance of unit 21 and between terminal 69 and 72 and hence decreases or increases the total resistance between alternating current input terminal 59 and the signal output terminal 67 of the bridge. As a result the potential at point 67 shifts in value towards the potential at point 59 for the condition where the flow in 11 decreases (greater concentration and conductivity) and shifts towards the potential at point 58 when the flow in 11 increases (lesser concentration and conductivity). Since a corresponding change does not occur in the values of the resistances 76 and 83, the potential at ground 80 does not change in respect to 58 and 59. Accordingly the signal voltage appearing at 67 is an alternating potential which is either in phase (i. e. of the same sign) or 180° out of phase (i. e. of reversed sign) as compared to the potential across the bridge input terminals 58 and 59. The numerical value of the alternating signal voltage at 67 depends, of course, upon the amount of resistance change in unit 21.

The signal voltage at 67 is transmitted to tube 89 where it produces a pulsating direct current output in the plate circuit, one pulse for each full alternating current wave in the supply lines, the pulse occurring completely during the negative or positive portions of the alternating current waves. It may be pointed out that the conductivity of tube 89 depends upon the emissivity of its cathode, the existence of the plate voltage supply and the value of the potential applied to grid 89. Since the plate potential supplied by the full wave rectifier tube 97 is constant and the cathode is constantly emissive, current flow through the amplifier tube 89 depends merely upon the voltage of grid 87. Hence, as the grid 87 becomes positive a current flows in the plate circuit of tube 87 and when the grid 87 is negative the current flow decreases. There is accordingly a pulsating (amplified) signal at junction 138 which is communicated through condenser 137 to the grids of the discriminator tube 130. The signal pulses occur once for each complete alternating current wave of the supply lines and they occur during either the positive halves or the negative halves of the waves. If the signal voltage at 67 is higher than ground potential during the positive halves of the alternating current wave, the signal voltage at 138 will occur simultaneously with the positive waves; if the voltage at 67 is higher than ground potential during the negative halves of the alternating current wave, the signal at 138 will occur simultaneously with the negative halves of the alternating current waves.

The utilization of the signals at 138 occurs in the discriminator tube 130. The discriminator tube 130 has its plates 142 and 150 connected directly to the terminals 145 and 153, respectively of transformer winding 146. Hence, when terminal 145 of the winding is positive, current will tend to flow from ground, through winding 144 of relay RI, line 143, plate 142, cathode 131, junction 124, through resistor 120 to tap 118 and thence to ground 141, and when terminal 153 is positive current will tend to flow from ground 148 through winding 146, terminal 153, winding 152 of relay RD, plate 150, cathode 127, junction 121, resistor 120, tap 118 to ground 141. Whether or not current does flow through one or the other relay coils depends upon whether there is a simultaneous signal pulse input from junction 138 via condenser 137 to junction 136 at the instant the alternating potential in coil 146 is in a direction to make such current flow. If, for example, a positive signal at 137 occurs when terminal 145 is positive, relay 144 will be energized, it being understood, of course, that such a signal pulse and resultant relay energization is repeated each positive half-cycle until the signal at 67 again changes and that the relay receives a series of direct current pulses and thus remains operated until the series of energizing pulses cease.

As an example of the operation it may be assumed that after a condition of stability has been in effect, the flow in pipes 11, 16, 20, 22 increases and that the mixture (with the fluid from tank 28) passing through unit 21 is more dilute and hence less conductive than previously. The correction required is an opening of valve 26 so as to increase the flow of fluid from tank 28, in order to restore the formerly existing condition. This correction occurs as follows:

When the dilution occurs the resistance of unit 21 increases thus making the resistance between input terminal 58 and signal terminal 67 a smaller fraction (than previously) of the total resistance between terminals 58 and 59 via terminal 67. This in effect brings the potential at 67 nearer to the potential at 58 than previously and signal terminal 67 is thus positive when 58 is positive and negative when 58 is negative. The positive half of the wave at 67 is the effective half and this is communicated to tube 89, therein amplified and applied via condenser 137 to the discriminator tube 130. It may be assumed that the connection of winding 146 is such that terminal 145 is positive when 58 is positive; if not the leads of one or the other of the windings is simply reversed to obtain this connection.

Hence, with the signal pulses being received at the grid 133 of the discriminator tube 130 each time plate 142 becomes positive, it follows that a pulsating direct current flows through winding 144, and relay RI is energized, contacts 157—158 close and motor 35 is energized and rotates in a direction to open valve 26, thus increasing the flow of fluid from tank 28 to correct the dilution which had initiated the action.

Relay RD does not operate because each time its plate is made positive, there is a negative signal on the grid which in addition to the normal bias makes the grid sufficiently negative so that little or no plate current flows.

Motor 35 continues to operate until the increased flow causes an increased concentration, hence lesser resistance in unit 21. This in effect reduces the magnitude of the signal voltage (read from 78 to 67) and when it has reached a certain minimum the signal pulses received at the discriminator tube are no longer sufficient to cause current to flow through the relay winding 144 in an amount to maintain it energized. Hence, relay RI drops out and motor 35 stops in its new position.

The reverse action occurs when the flow in pipe 11, 16, 20, 22 decreases, causing in effect an increased concentration and greater conductivity in unit 21. When this occurs the voltage at 67 shifts towards the voltage at 59, causing operation of relay RD, which in turn closes contacts 160—161 to energize and hence rotate the motor 35 in a valve closing direction. This action likewise continues until the excess concentration has been corrected by a reduction in flow of the tank 28 fluid.

The purpose of unit 15 is to correct and adjust the operation for variations in the basic or initial ionization (conductivity) of the incoming fluid flowing in line 11. Should the residual ionization of the fluid in line 11 increase this effect will be apparent as an increase in conductivity in unit 15 and also in unit 21. Since an equal increase in conductivity is evidenced by an equal decrease in resistance through both units 15 and 21, there is no disturbance of the relative value of the signal voltage at 67. A decrease in ionization of the incoming fluid in pipe 11 has an exactly opposite effect.

A further representative installation utilizing the methods and apparatus of the invention is illustrated in Figure 3 wherein the reservoir 175 may be of any size or may be merely a holding tank in the supply line 176, which is provided with an outlet 177 through which the fluid flows in the direction of the arrow 178. The flow passes through control conduction unit 180, line 181, conduction unit 182, line 183, thence through a mixing T 184, line 185, conduction unit 186, line 187 and to a holding tank 188, line 189, conduction unit 190 and thence to the load as indicated at the line 192 which withdraws the fluid at any rate from zero up to the full capacity of the system and is subject to changes in rate. The conduction units 180, 182, 186 and 190 are of the type illustrated in Figure 2, or of similar construction. To the mixing T 184 there is connected line 25 which, like that shown in Figure 1, includes a valve 26 which is opend or closed by a reversible motor 35 operating through the gear train 33. Line 25 is the outlet line for the tank 28 which is maintained under pressure by pressure line 30 or is simply an elevated tank utilizing hydrostatic pressure. The motor 35 is of the same type as that shown in Figure 1 except that to the motor or to the gear box 33 there is geared a resistor 194 so connected to increase in value as the motor is rotated to close the valve 26 and is decreased in value as the motor operates in the opposite direction to open the valve 26. The three motor leads are indicated at L₁ which is the common lead, line D which is energized to rotate the motor in a valve closing direction, thereby to decrease the flow through valve 26 and line I which when energized rotates the motor in a direction so as to open the valve 26 and increase the flow therethrough.

The three lines L₁, D and I are grouped in cable 36 as in Figure 1 and are connected to a transformer and electron tube control device shown opposite the bracket 40, this device being precisely as described with reference to Figure 1. It will be noted that in Figures 1 and 3 the transformer winding 53 is connected to supply lines 55 and 56 which communicate in each instance with the resistance bridge shown opposite the bracket 45 of Figure 1. The difference between the methods and apparatus shown in Figures 1 and 3, respectively, are in the make-up and performance of the resistance bridge portions 45 and 170 of the two systems. In Figure 3 the alternating current supply lines 55 and 56 from transformer 52 extend to input terminals 198 and 215, respectively, of the alternating current bridge, and an alternating potential of suitable value is accordingly impressed on these terminals when transformer 52 is energized. From terminal 215 a circuit extends through line 199 to terminal 200 and thence over line 201 to one terminal of the conduction unit 186. The circuit continues from the other terminal of the conduction unit 186 to terminal 203 and thence through resistor 204 to terminal 206 from which the circuit extends over line 207 to one terminal of the conduction unit 182. From the other terminal of the conduction unit 182 the circuit continues over line 210 to terminal 211 and thence over line 212 to the opposite input terminal 198. This completes the circuit between the alternating supply terminals 215 and 198 by way of the upper half of the bridge as shown in Figure 3.

The lower half of the bridge circuit is from supply terminal 215 to terminal 216, thence over line 217 to one terminal of the conduction unit 180. The circuit continues from the opposite terminal of the conduction unit 180 over line 218 to terminal 220, thence through resistor 221 to ground terminal 222, the ground being illustrated at 223. The circuit continues from terminal 222, over line 224 to conduction unit 190, and thence from conduction unit 190, over line 228 through the motor operated resistor 194, from which the circuit continues over line 230 to the alternating current supply terminal 198.

Referring to Figure 1 it will be remembered that when the potential upon terminal 67 approached the potential upon terminal 58 so that both would become positive, the control mechanism operated, thereby to open the valve 26 and increase the flow of liquid therethrough. Similarly every change of resistance valve in the bridge circuit of Figure 3, which tends to make the potential at the signal terminal 205 positive and hence in phase with the potential at 198, likewise serves to cause an increase in flow of fluid through valve 26. Exemplary operating conditions are as follows:

*Increase in flow in lines 177–192.*—It is assumed that precedent conditions are stable and that the fluid in line 177 is of uniform quality. If an increase in flow of fluid from line 192 then occurs, there will be no change in the resistance of units 180 and 182, and no immediate change in the resistance of unit 190 due to the capacity of the holding tank 188. The resistance of 186 increases, however, due to the dilution of the fluid flowing through it, and consequently the potential at 205 shifts towards the potential at 198 and is therefore in phase with it. As explained with reference to Figure 1, such a condition causes the closure of relay RI and an operation of motor 35 in a direction to open the valve 26 and increase the flow from tank 28. In so operating, the motor operates its resistor 194 in a direction to decrease its value, and this has the effect of tending to balance the bridge circuits, and consequently to decrease the value of the signal at 205 gradually as the valve 26 is moved towards its new position. Thus, as the valve 26 is moved to its new (corrected) position, the resistor 194 is likewise moved in a direction so as gradually to re-balance the bridge. This helps to prevent overshooting and the corrective motion of the valve is hence accomplished by a deadbeat or nearly deadbeat operation rather than by a series of hunting oscillations of decreasing scope. It may be pointed out that the full scale value of resistor 194 may be varied so that for a given valve motion a greater or lesser bridge-counterbalancing effect may be obtained. A convenient variation can be obtained for purposes of experimentally changing the values by adding a manually variable resistance in series with resistor 194 and a second manually variable resistor in parallel with resistor 194 or in parallel with it and the manually variable resistor.

*Decrease in flow in lines 177—192.*—When a decrease in flow occurs and quality of the fluid flowing in 177 is constant, the resistance of 180 and 182 is constant and that of unit 186 decreases. Consequently, the voltage at 205 shifts towards the value of the voltage at 215, relay RD operates and motor 35 is energized and rotates in a direction to close valve 26 and simultaneously resistor 194 is operated in a direction to increase its value, thus re-balancing the bridge and reducing the signal value as the valve is moved to its corrected position.

*Change in quality of fluid in 177.*—When this occurs the values of resistance of 180, 182, 186 and (later on) of 190 are all changed in equal amounts, decrease or increase as the case may be. The addition or subtraction of equal resistances in units 182 and 186 are compensatory and cause no out of balance of the bridge or valve operation. The addition or subtraction of resistance from 180 and 190 are likewise compensatory, although there is a time delay between the time unit 180 assumes its changed condition and the time unit 190 assumes the corresponding change. This is due to the fact that the contents of holding tank 188 must be changed by the fluid flow through the system. If the incoming fluid in line 177 is more conductive than previously flowing (as would be the case if, for example, the fluid was water and contained an increased salts concentration) units 180, 182 and 186 would all have lowered resistance and since these units may be fairly close together the change in them would be nearly simultaneous, especially if there is a considerable flow through the system. However, the assumed more conductive fluid would not reach unit 190 until some time later, depending on the size of tank 188. In water systems utilizing the invention for feeding chlorine into drinking water, the capacity of tank 188 is preferably made large enough to contain about one-half to three hours capacity at normal loads so as to allow the chlorine to act. Hence, unit 190 under such circumstances would change in response to the increased conductivity of the incoming supply until that period had elapsed.

Thus, at the outset of the delay period the decreased resistance of units 180, 182 and 186 without a corresponding decrease in resistance of unit 190 makes the voltage at 205 approach the voltage at 198 and as a result relay RI operates and increases the flow through valve 26. At the end of the time delay period the resistance of unit 190 decreases due not only to the increased conductivity of the incoming supply but also due to the increased flow through valve 26 and hence relay RD operates and the valve closes to a lower position than originally, before the change in quality of the flow through line 177. A change in the conductivity quality of the flow in line 177 thus occasions an oscillation in the system, the time period of which depends upon the capacity of tank 188. These oscillations are not serious since the quality changes in the incoming supply usually occur very slowly over long intervals and the holding time in tank 188 therefore does not impose an appreciable percentage delay factor.

*Maintenance of excess function of unit 190.*—In the treating of drinking water with chlorine it is desirable to maintain a residual chlorine content of 0.2 to 0.6 part per million. Any excess of this amount becomes noticeable either by sense of taste or smell and furthermore there is a waste of chlorine. Any value of residual chlorine less than this amount indicates that an insufficient amount of chlorine has been provided for the water in question and there is danger of undertreatment permitting the possible existence of either pathogenic bacteria or algae in the treated water.

Tank 188 is usually provided in chlorine systems, in order to provide the necessary time element of one-half to three hours in the chlorine treatment process. Organic matter is not always instantly destroyed when brought in contact with chlorine. The time of reaction is a function of type of organic material, size and quantity present in water. Thus, the reaction tank provides the assurance that no undesirable organic matter is present in the treated water providing that there is a slight excess of chlorine present after a given interval of time.

Unit 190 serves to insure the desired excess. Thus, signal voltage tap 205 is originally adjusted so that a predetermined excess of chlorine is provided in the treated water flow in line 192. Should the excess decrease, the conductivity of unit 190 decreases, that is to say, the resistance increases. This causes the voltage at signal tap 205 to approach the voltage at 198, thus causing relay RI to operate and valve 26 to open. There is accordingly provided an increased chlorine flow into the mixing union 184 and a restoration of the prescribed excess. Too great an excess in the flow through unit 190 causes an opposite function and decrease in flow of chlorine into the system.

In either of the systems shown in Figure 1 or 3, and elsewhere where the invention is utilized, there may, if needed, be included insulating pipe connectors so as electrically to insulate the pipes through which the fluids are carried. These are shown in dotted lines at B in Figures 1 and 3.

As many apparently widely different embodiments of this invention may be made without departing from the spirit and scope thereof, it is to be understood that I do not limit myself to the specific embodiments herein except as defined by the appended claims.

What I claim is:

1. A fluid regulator comprising first and second channels connected to a junction for admixture of the fluid flows thereof and a mixed flow channel from the junction for carrying away the mixed fluids therefrom, two pairs of electrically conductive terminals immersed in the fluid of the first channel, two pairs of electrically conductive terminals immersed in the fluid of the mixed fluid channel, an electrical bridge circuit having the electrically conductive terminals that are immersed in the first channel connected in two legs of the bridge and the electrically conductive terminals that are immersed in the mixed fluid channel connected in the two other legs of the bridge circuit; a discriminator electron tube which is connected to the bridge circuit, a relay operated reversing circuit connected to the discriminator tube and a valve in the second channel operated by a reversible motor connected to said reversing circuit.

2. A fluid regulator comprising first and second channels connected to a junction for admixture of the fluid flows thereof and a mixed-flow channel from the junction for carrying away the mixed fluids therefrom, means including a valve in the second channel and a reversible motor drive therefor, and devices responsive to the electrical conductivity of the fluid in the first channel and the electrical conductivity of the fluid in the mixed flow channel for regulating the rate of flow of fluid through the second channel, and means connected to the valve motor counterbalancing the effect of the devices responsive to the electrical conductivity of the fluids in the first and mixed fluid channels.

3. An apparatus for adding a controlled amount of chlorine to untreated water comprising a mixing chamber, a first conduit for delivering untreated water to said mixing chamber, a second conduit for delivering chlorine to said mixing chamber, a conduit for delivering said chlorine treated water from said mixing chamber, electric conductive elements immersed in said conduit for delivering untreated water and in the conduit for delivering chlorine treated water for measuring the specific conductivity thereof, valve means located in the second conduit for delivering chlorine, and a motor control for opening and closing said valve connected to said electric conductive elements for regulating the amount of chlorine passed through said valve in accordance with the rate of flow of the water in the system and means connected to the motor control for counterbalancing the effect of said electrically conductive elements.

4. The apparatus of claim 3 further characterized in that said conduit for delivering chlorine treated water includes a holding tank therein and an outlet, and there is provided means immersed in the outlet, said motor control being connected thereto, and means immersed in said conduit carrying chlorine treated water and the first conduit carrying untreated water so as to be operated thereby.

5. A fluid regulator as set forth in claim 1 characterized in that there is provided a storage chamber in the mixed fluid channel disposed between the pairs of electrically conductive terminals immersed in said mixed fluid channel, said storage chamber being adapted for temporarily storing the fluid in said channel whereby the length of time of contact between said mixed fluids may be increased.

6. A fluid regulator as set forth in claim 1 characterized in that there is provided a variable resistor connected in the second named legs of said bridge circuit, said variable resistor being operated by said reversible motor for balancing said bridge circuits.

7. A fluid regulator comprising first and second channels connected to a junction for admixture of the fluid flows thereof and a mixed flow channel from the junction for carrying away the mixed fluids therefrom, a storage chamber in the mixed fluid channel for temporarily storing the fluid in said channel, first means responsive to the electrical conductivity of the fluid flow in the first channel, second means responsive to the electrical conductivity of the fluid flow in the mixed fluid channel positioned before the storage chamber, and third means responsive to the electrical conductivity of the fluid flow in the mixed fluid channel positioned after the storage chamber for regulating the flow of fluid through the second channel.

RAY M. POTTER.

REFERENCES CITED

The following references are of record in the file of this patent:

UNITED STATES PATENTS

| Number | Name | Date |
|---|---|---|
| 669,335 | Behrend | Mar. 5, 1901 |
| 1,388,613 | Simsohn | Aug. 23, 1923 |
| 1,450,023 | Edleman | Mar. 27, 1923 |
| 1,830,333 | Parker | Nov. 3, 1931 |
| 1,943,487 | Ruth | Jan. 16, 1934 |
| 1,944,803 | Ornstein | Jan. 23, 1934 |
| 1,944,804 | Ornstein | Jan. 23, 1934 |
| 1,951,035 | Parker | Mar. 13, 1934 |
| 2,076,964 | Pomeroy | Apr. 13, 1937 |
| 2,289,589 | Pomeroy | July 14, 1942 |